Dec. 22, 1970   C. R. HOLLIS   3,549,462
APPARATUS FOR HEAT SEALING THE ENDS OF BAG BLANKS INCLUDING BAG
GRIPPING DEVICES CARRIED BY TWO CONVEYORS RUNNING
IN NESTED PATHS
Filed Nov. 3, 1967   7 Sheets-Sheet 1

Dec. 22, 1970 C. R. HOLLIS 3,549,462
APPARATUS FOR HEAT SEALING THE ENDS OF BAG BLANKS INCLUDING BAG
GRIPPING DEVICES CARRIED BY TWO CONVEYORS RUNNING
IN NESTED PATHS
Filed Nov. 3, 1967 7 Sheets-Sheet 3

Fig. 3.

Dec. 22, 1970    C. R. HOLLIS    3,549,462
APPARATUS FOR HEAT SEALING THE ENDS OF BAG BLANKS INCLUDING BAG
GRIPPING DEVICES CARRIED BY TWO CONVEYORS RUNNING
IN NESTED PATHS
Filed Nov. 3, 1967    7 Sheets-Sheet 6
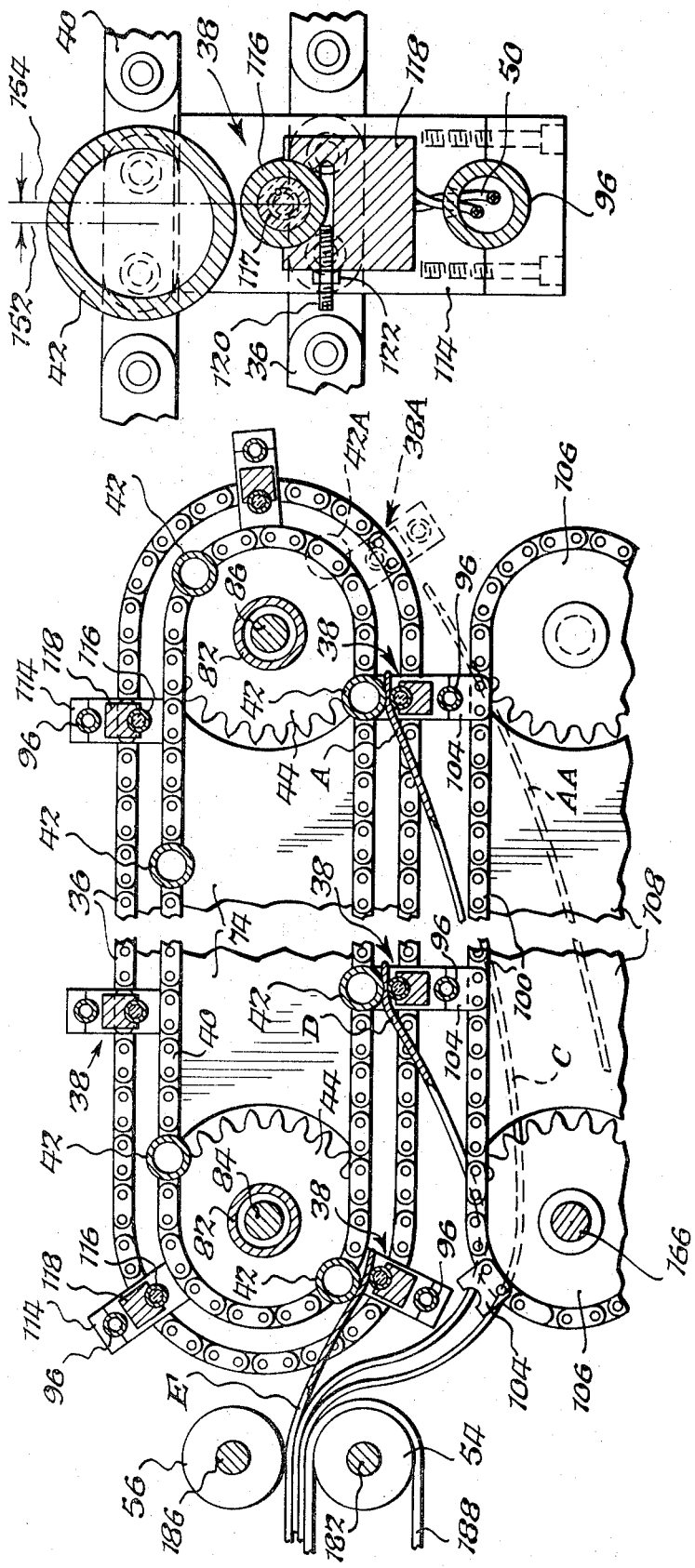

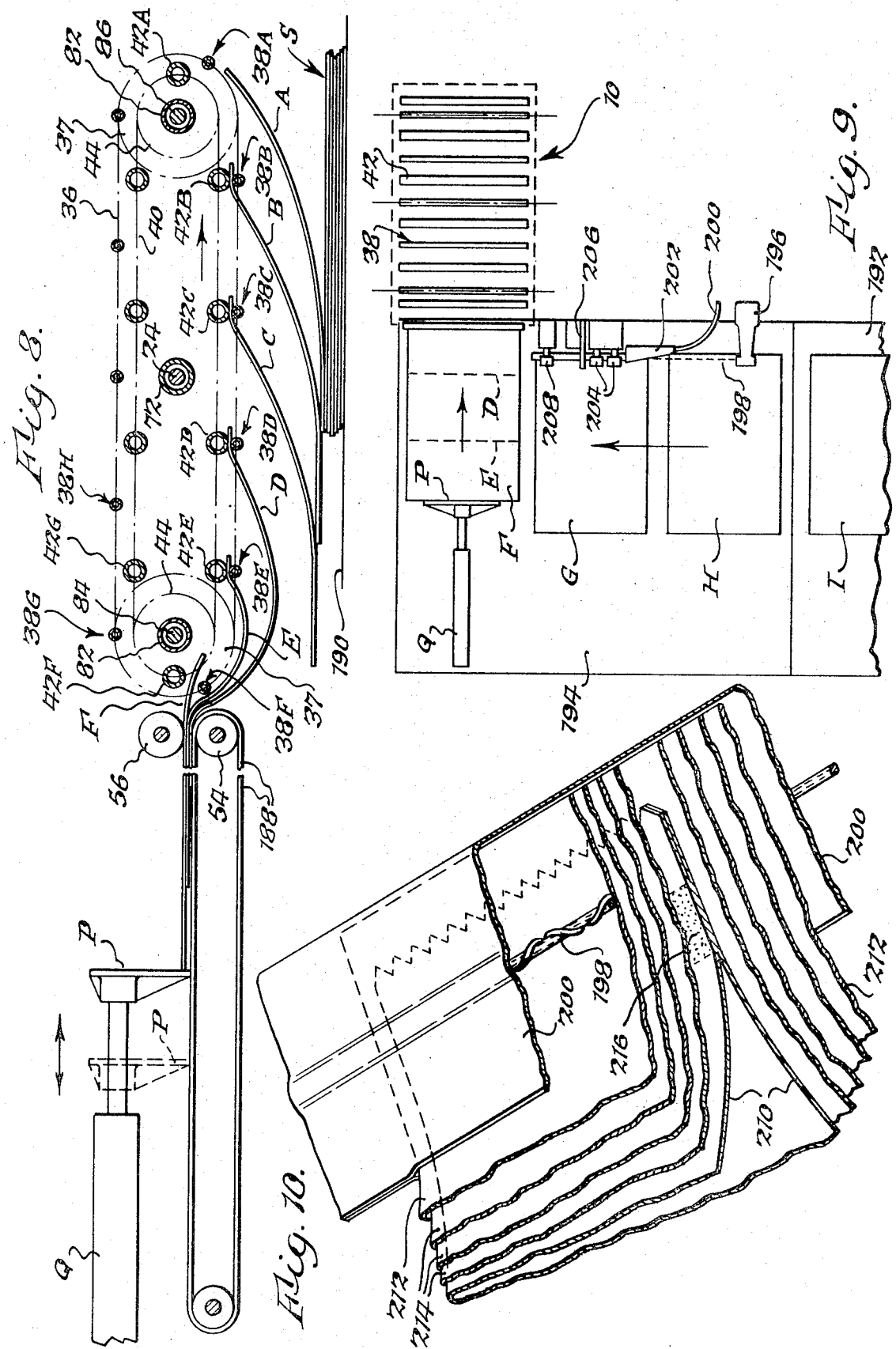

United States Patent Office 3,549,462
Patented Dec. 22, 1970

3,549,462
APPARATUS FOR HEAT SEALING THE ENDS OF BAG BLANKS INCLUDING BAG GRIPPING DEVICES CARRIED BY TWO CONVEYORS RUNNING IN NESTED PATHS
Clinton R. Hollis, Camden, Ark., assignor to International Paper Company, New York, N.Y., a corporation of New York
Filed Nov. 3, 1967, Ser. No. 680,528
Int. Cl. B30b *3/06, 15/34;* B32b *31/20*
U.S. Cl. 156—583   13 Claims

ABSTRACT OF THE DISCLOSURE

Apparatus for heat sealing thermoplastic inner liners of multiwall shipping bags in manufacture thereof in a continuous production line. Bag blanks closed at one end by stitching and taping are overlapped lengthwise and successively inserted between heating elements and backing bars carried respectively by chains continuously moving in nested paths including straightaway portions in which inserted bags are gripped between heating elements and bars to form transverse line of heat sealing adjacent to and inside the line of stitching on each bag end. Nesting of chains and overlapping of bags provides adequate pressure and retention time for sealing wide variety of bags at high production speeds in machine occupying little floor space and requiring minimum adjustments for operation on runs of bags of different sizes and constructions.

FIELD AND BACKGROUND OF THE INVENTION

In the manufacture of bags made of, or embodying at least an inner liner made of, thermoplastic sheet material the use of chain- or belt-carried heating and pressure applying elements for forming transverse manufacturer's or bottom closures is well known. When the elements which grip the bag are carried on a single chain or belt provision must be made for movement of one or both of those elements relative to the chain in order to permit insertion of the bag blank between a pair of such elements and thereafter to bring the elements into gripping engagement with the bag. Such arrangements are shown, for example, in U.S. Pats. Nos. 2,163,278 granted June 20, 1939 to Hayes, and 3,192,095 granted June 29, 1965 to Doyen et al. When the elements which grip the bag are carried, respectively, on separate chains or belts the separating of pairs of elements to permit insertion of the bag and the bringing of the elements into gripping relation with the bag can be effected by causing the paths of travel of the elements to separate and to coincide at proper times without the necessity for relative movement of the elements and the chains on which they are carried. Examples of such arrangements are found in U.S. Pats. Nos. 2,720,-246 granted Oct. 11, 1955 to Piazze, 3,122,467 granted Feb. 25, 1964 to Hannon, 3,140,218 granted July 7, 1964 to Hannon, and 3,147,168 granted Sept. 1, 1964 to Bateman. In general, machines employing two chains or belts can only form heat seals at intervals at least equal to the full length or width of the bags and thus the bags must travel at a linear speed determined by the rate of production and the length or width of each bag, as the case may be. When it is desired to manufacture heavy-duty shipping bags of large size and usually having several plies of paper enclosing the thermoplastic inner liner the speed of travel must be very high if the bags are to be held under heat and pressure for the required time at a high production rate. This results in machines of very great length with large numbers of expensive heating elements strung out on the chains or belts.

BRIEF DESCRIPTION OF THE INVENTION

The present invention provides heating and backing elements on separate chains the paths of which intersect in an operating zone. However, the elements are placed at fixed intervals along the lengths of the chains and the bag blanks are fed in overlapping relation so that the ends of the bags to be sealed are brought into a spaced relation coinciding with the fixed intervals between the successive elements on the chains. Thus, only the speed of insertion of the bags needs to be varied to accommodate runs of bags of different lengths. Since the spacing between successive pairs of heat sealing elements is fixed and is much less than the lengths of the individual bag blanks the heat sealing machine may run at a relatively slow speed even though the production rate may be high. Savings in initial cost and upkeep of the machine as well as in floor space occupied by the machine are realized.

The objects of the present invention are accomplished by arranging the path of one of the chains inside the path of the other and running the chains at the same linear speed whereby the elements carried by the inner, shorter, chains will complete a path circuit more quickly than the elements on the outer chain. Thus, to achieve relative opening and closing of pairs of elements advantage is taken, not only of the diverging and converging of the paths of the chains but also of the advancement of the elements on the inner chain relative to those on the outer chain. In this manner the bags are inserted between elements when the latter are quite widely spaced apart, the advancement of the inner elements brings the elements into gripping engagement with the bags and, after a straightaway run in which sealing is effected, the elements move apart to release the sealed bag blanks. All of this is accomplished without any need for movement of any parts of the elements relative to the chains on which they are, respectively, carried.

Further features of the invention include a novel provision for distribution of electric power to the continuously moving heating elements and provision for simple and rapid adjustment of one set of elements relative to the other to accommodate runs of bags of different thickness.

BRIEF DESCRIPTION OF THE DRAWINGS

FIG. 3 is a side elevation of the side of the machine opposite that shown in FIG. 1;

FIG. 6 is an enlarged vertical longitudinal sectional view taken along the irregular line 6—6 in FIG. 4;

FIG. 7 is a still further enlarged vertical longitudinal sectional view taken along the line 7—7 in FIG. 4;

FIG. 8 is a diagrammatic illustration of the machine showing operation thereof on bags;

FIG. 9 is a diagrammatic plan view, on a reduced scale, showing the machine of the present invention in its relation to a bag production line; and FIG. 10 is a developed fragmentary sectional view of one type of multiwall, thermoplastic lined bag which may be sealed on the machine of the present invention.

DESCRIPTION OF THE PREFERRED EMBODIMENT

Figure 1:
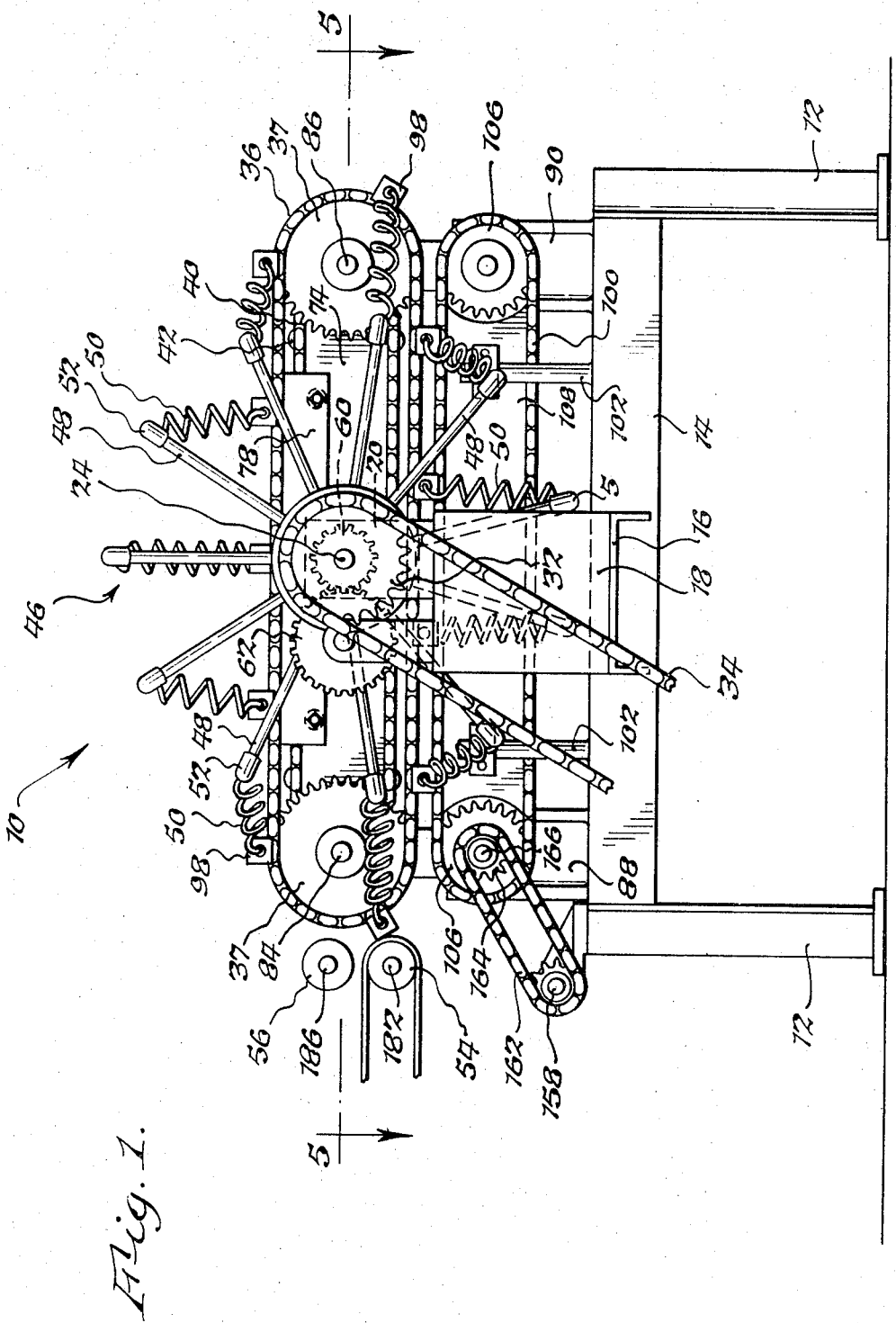
FIG. 1 is a side elevation of the drive side of a machine embodying the present invention.
Figure 4:
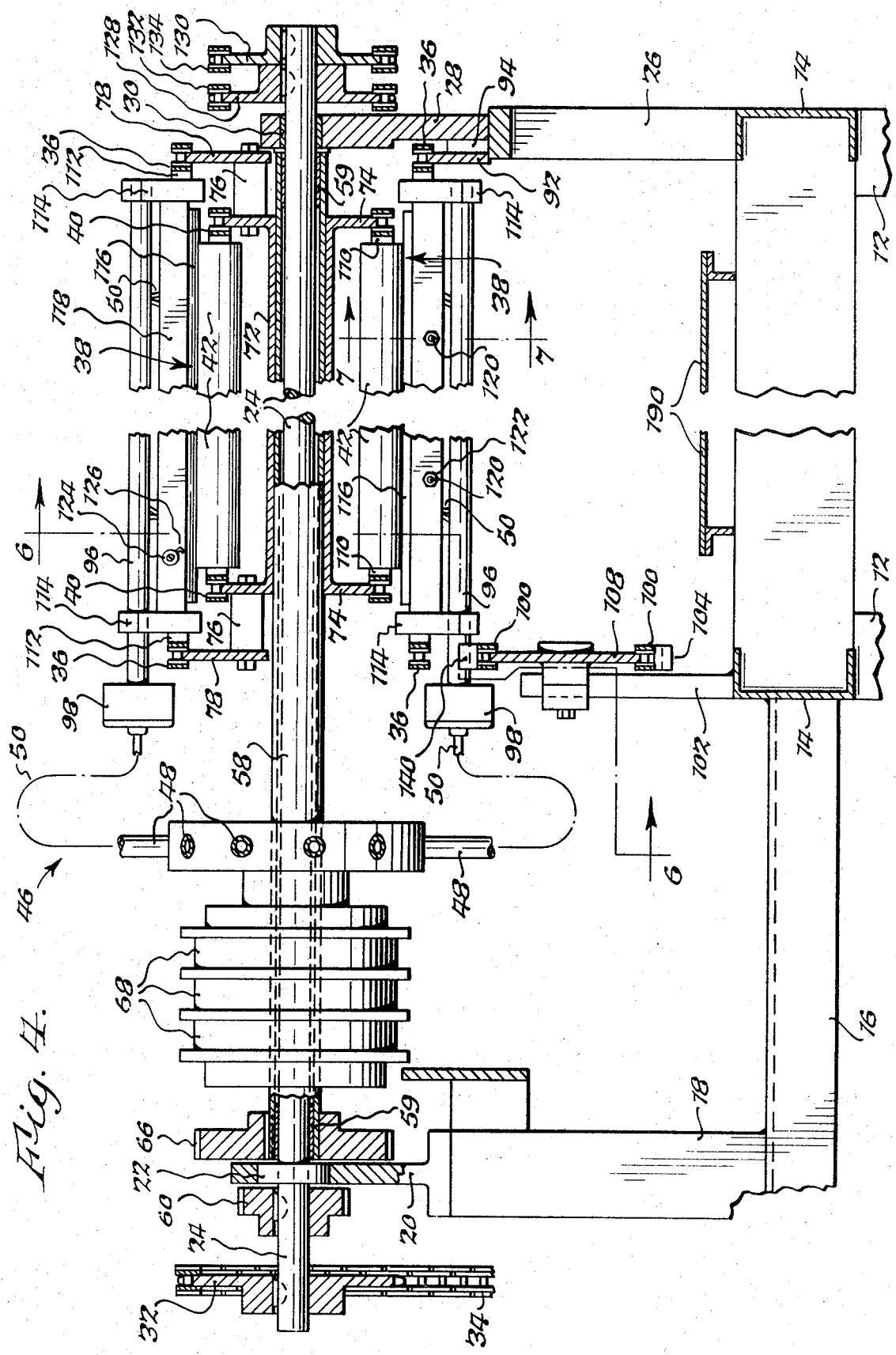
FIG. 4 is a vertical sectional view taken along line 4—4 in FIG. 3.

Referring now to the drawings in FIG. 1 the machine which is generally indicated at 10 is mounted upon a suitable frame including vertical legs 12 and horizontal members 14. Referring briefly to FIG. 4 there is shown a laterally extending frame member 16 to which is secured an upright 18 carrying a plate 20 which serves as a fixed mounting for a bearing 22 for one end of the main drive shaft 24. At the right hand side of FIG. 4 there is shown an upright 26 which serves to support a plate 28 carrying a bearing 30 for the opposite end of said main drive shaft 24. Referring back to FIG. 1, the main drive shaft 24 has keyed thereto a sprocket 32 which is driven in a counterclockwise direction by a chain 34. The chain 34 is driven by a motor, not shown, which preferably is of the adjustable speed type whereby the desired operating speed for the machine as a whole may be accurately established to accommodate the machine for the particular speed at which the production line is operating.

Figure 2:
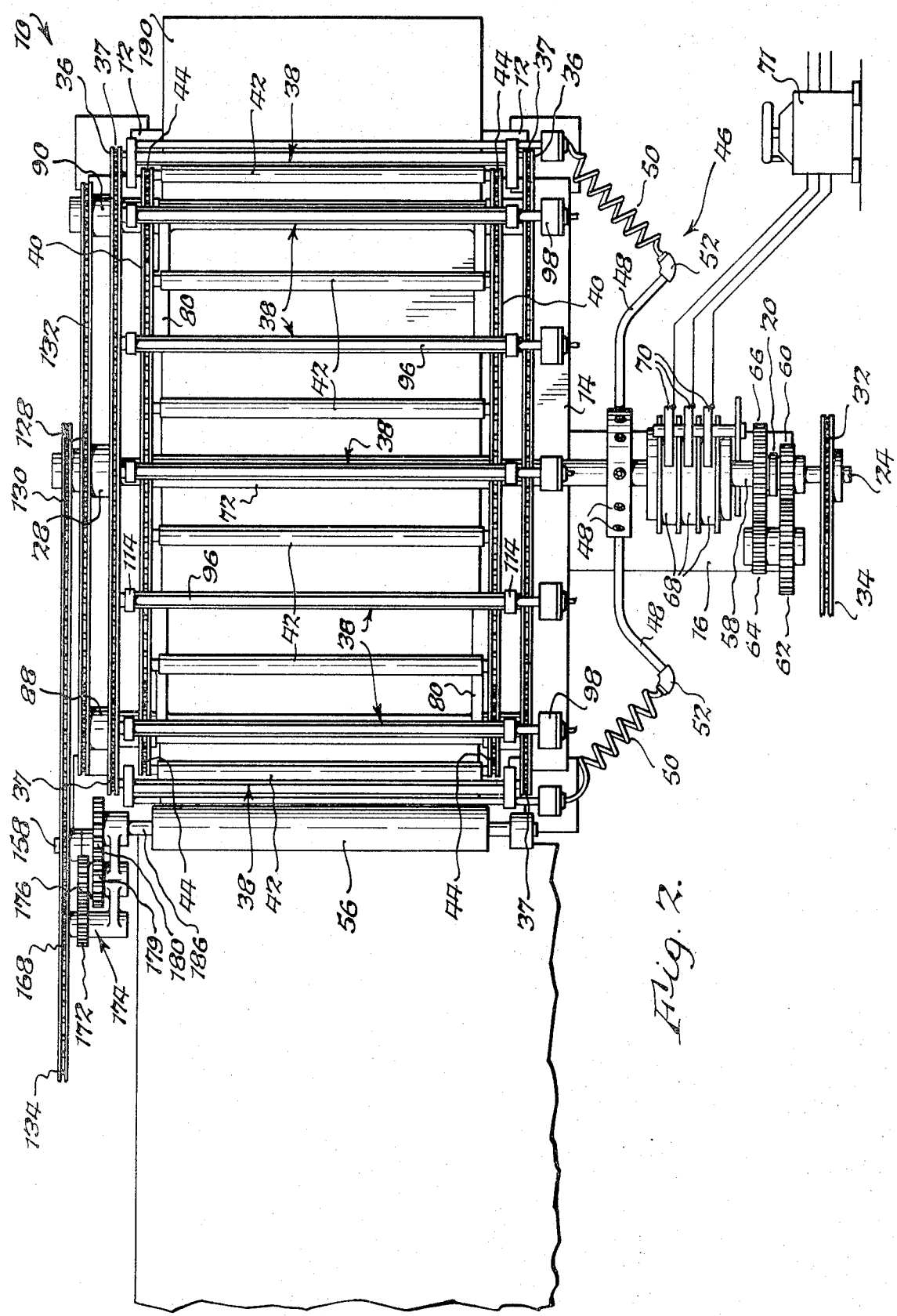
FIG. 2 is a top plan view of the same.

As shown in FIGS. 1 and 2 major operating elements of the machine 10 include laterally spaced pair of endless chains 36 carrying, at evenly spaced intervals throughout their lengths, a plurality of transversely disposed heating elements 38. The chains 36 are driven through parallel endless paths by a set of four sprockets 37 of a predetermined diameter. A second pair of laterally spaced endless chains 40 carry a plurality of transversely disposed heater backing bars 42 which are evenly spaced around the length of the chains 40 at intervals exactly matching the spacing between the heater elements 38 on the chains 36. The chains 40 are driven through parallel endless paths by a set of four sprockets 44 which are concentric with the sprockets 37 for the chains 36 but which are of smaller diameter than the predetermined diameter of sprockets 37.

In the embodiment of the invention herein disclosed the relationship between the diameters of the sprockets 37 and the sprockets 44 is such that the endless path for the inner endless chains 40 carrying the backing bars 42 is shorter than the endless path of the outer chains 36 by a length exactly corresponding with one length of the intervals between the heating elements 38 or backing bars 42 on the respective chains. In this embodiment of the invention the number of backing bars 42 provided on the inner chains 40 is one less than the number of heating elements 38 carried by the chains 36. From the following detailed description it will become apparent that the difference in number of heating elements and backing bars may be two or more without departing from the spirit of the present invention but in any event the difference in overall length of the paths of the chains 36 and 40 should be equal to one or some multiple of the interval between adjacent heating elements 38 or backing bars 42 on their respective chains. A fundamental point of the present invention is that the chains 36 and 40 are driven at identical linear speeds and the heating elements 38 and backing bars 42 come into a predetermined vertical registry as they enter the lower horizontal run of their parallel paths, that is, as they move from left toward the right in FIG. 1 between the lower peripheral portions of their respective sprockets 37 and 44. In this portion of the path the heating elements 38 and backing bars 42 are brought closely enough together that they will grip the leading ends of bags to be heat sealed and will carry them through said lower horizontal run while exerting heat and pressure thereon to cause heat sealing of the thermoplastic material from which the bag is made or which is included within its construction.

Referring to FIG. 1, there is shown a spider generally indicated at 46 which rotates in a counterclockwise direction at such a speed as to complete one revolution for each complete excursion of the chains 36 through their endless paths. The spider 46 includes a plurality of tubular arms 48 containing electric wires 50 which emerge from the arms at fittings 52. The electric wires 50 are each fromed into a spring coil and extend respectively to the heating elements 38 and serve to supply electric power to each of the heating elements during operation of the machine. From a consideration of FIG. 1 it will be observed that the spring coil wires 50 will expand and contract to accommodate the changing angular and distance relationships between the heating elements 38 and the spider arms 48 which are incident to the fact that the heaters progress through a generally rectangular path whereas the ends of the spider arms 48 progress in a circular path.

Also in FIG. 1 there is shown a pair of feed rolls 54 and 56 which together with other apparatus to be described serve to supply bags in accurately timed sequential relation for engagement between successive pairs of heating elements 38 and backing bars 42. As will be described hereinbelow the feed rolls 54 and 56 preferably are driven at a cyclically variable rate of speed such as to rapidly advance the bag blank toward entering position and then to fed the bag blank at a slower rate of speed for a brief period during which alignment with and gripping by the heating elements 38 and backing bars 42 can occur after which the bag blank is rapidly advanced so that it may progress in a slack, hanging condition preparatory to the infeed of the next successive bag. In the preferred embodiment shown herein there usually will be three or more bag blanks within the grip of the feed rolls 54 and 56 at any given time with each bag in a different position of progression into the machine. Each bag eventually leaves the feed rolls 54 and 56 to be dragged through the machine toward the discharge point while the heat sealing operation is being effected.

Referring now to FIGS. 2 and 4 it will be observed that the main drive shaft 24 is telescoped within and concentric with a hollow drive shaft 58 which is rotatable on bearings 59 carried by the drive shaft 24. The spider 46 is keyed to the hollow drive shaft 58. The hollow drive shaft 58 is driven at a selected speed relative to the other parts of the machine through a gear train comprising a spur gear 60 keyed to the drive shaft 24, idler cluster gears 62 and 64, and a spider drive gear 66 which is keyed to the hollow shaft 58. The hollow shaft 58 also has keyed to it a set of three collector rings 68. Brushes 70 supported on the machine frame bear upon the rings 68 and are connected with a suitable three-line power source. The collector rings 68 are internally wired to the wires 50 which extend through the spider 46 for distribution to all heater elements 38.

In view of the electrical power distribution system just described wherein completely unobstructed paths must be maintained for the spring wire coils 50 leading from the spider 46 to each of the heating elements 38, it will be apparent that certain elements of the machine must be supported in cantilever fashion from the side of the machine which is opposite the rotating spider 46. Thus as shown in FIG. 2 the main drive shaft 24 is supported (at the lower end as viewed in FIG. 2) by the rigid bearing plate 20. Since the spider 46 is concentric with the main drive shaft 24 such shaft need not be cantilevered and it can serve as a principal lateral support for a subframe of the machine on which the chains 36 and 40 are mounted. In the illustrated embodiment the subframe just referred to includes a tubular member 72 which surrounds a portion of the length of the hollow spider drive shaft 58 (see FIG. 4) and thus derives vertical support through the spider drive shaft 58 and the main drive shaft 24. Also, as shown in FIG. 4, the tubular subframe member 72 has rigidly secured thereto vertically disposed guide plates 74 for the upper and lower runs of both of the inner chains 40. The plates 74 have secured thereto spacer blocks 76 which in turn support guide plates 78 for the upper runs of both of the outer chains 36.

Figure 5:
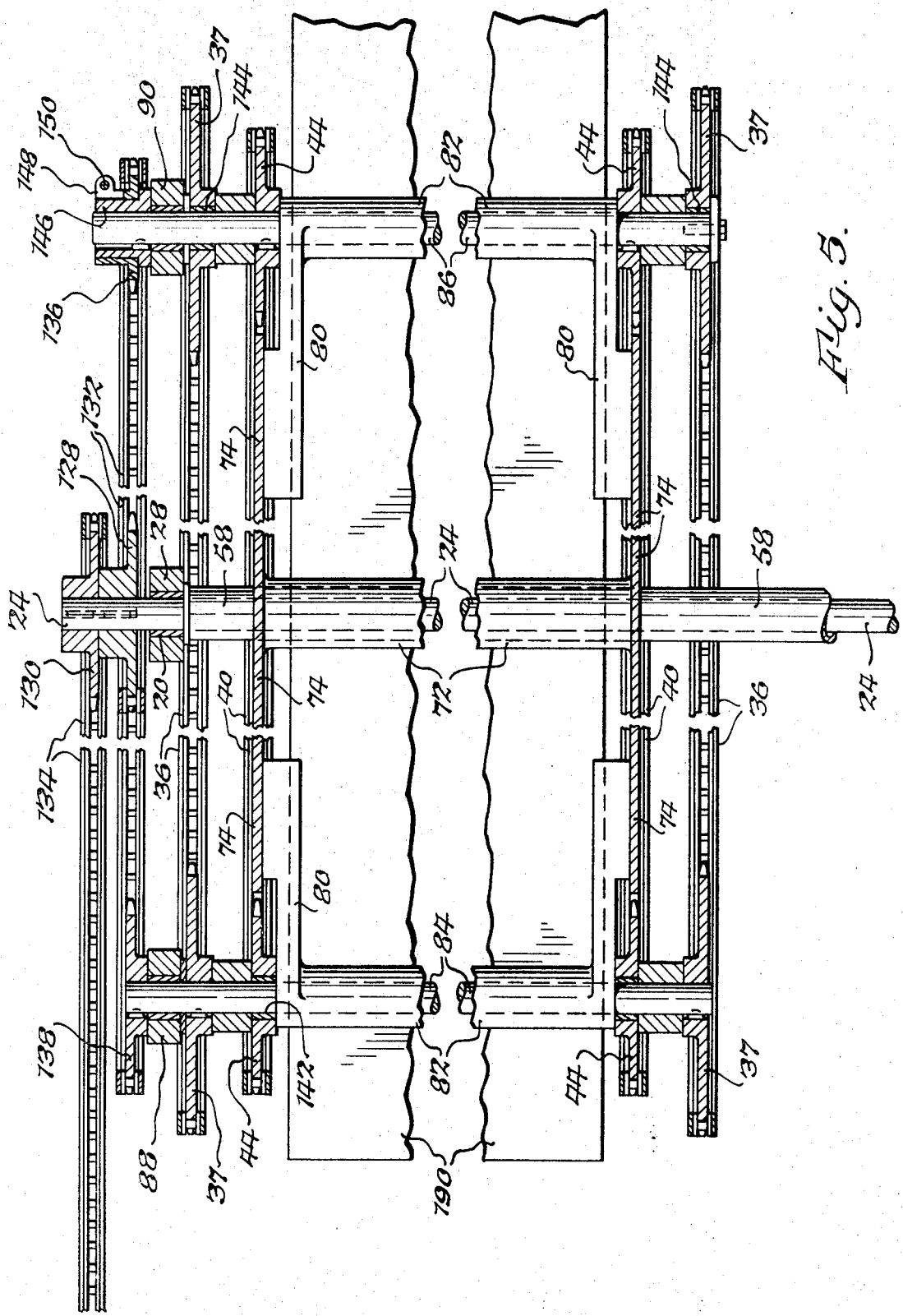
FIG. 5 is a horizontal sectional view taken along line 5—5 in FIG. 1.

Referring now to FIG. 5 it will be noted that the guide plates 74 have secured thereto or integral therewith four corner plates 80 which are rigidly connected with the opposite ends of tubular subframe elements 82 which rotatably receive sprocket shafts 84 and 86 which will be described in further detail below. For the present however it should be noted that the various subframe elements just described are all rigidly interconnected and form an open framework which floats centrally upon the main drive shaft 24. The sprocket shaft 84 shown on the left hand side of FIG. 5 is rotatably mounted, at the upper end thereof as viewed in FIG. 5, in a bearing fixed in a rigid frame bearing member 88. The sprocket shaft 86 at the right hand side of FIG. 5 is similarly mounted in a rigid frame bearing member 90. Thus the upper ends of the three shafts 24, 84 and 86 are all held on fixed axes in frame mounted bearings while the lower or open ends of the shafts 84 and 86 are rigidly supported by the tubular subframe elements 82.

By referring briefly to FIG. 6, it will be seen that the guide plates 74 for the inner chains 40 substantially fill all of the space between the sprockets 44 on which these chains run. Hence substantially the entire lengths of the upper and lower horizontal runs of chains 40 are firmly backed up and guided by the edges of the plates 74.

By referring briefly to FIGS. 1 and 3, it will be seen that the guide plates 78 for the outer chains 36 extend through a substantial portion of the lengths of the upper horizontal runs of chains 36. The lower run of the chain 36 which appears on the right-hand side of FIG. 4 is supported by a guide plate 92 secured through spacer blocks 94 to the bearing frame members 28, 88 and 90 (see FIG. 3).

The lower horizontal run of the chain 36 which appears at the left-hand side of FIG. 4 cannot be supported by a guide plate because of the manner in which the electrical wiring is connected with the heater elements 38 carried by the chain 36. As shown in FIG. 4 and in more detail in FIG. 7 the heater elements 38 are made up of a number of parts, some of which extend across the chain 36 outside the path thereof. While this will be described in greater detail below, it is apparent in FIG. 4 that each heater element 38 includes a conduit 96 with a junction box 98 through which the wires 50 extend from spider 46 to the interior of the heating element. Each of the conduits 96 extend across and outside of the lower run of chain 36. Accordingly, a lower run support chain 100 is mounted on bearing member 102 secured to the main frame 14 on the left-hand side of the machine as viewed in FIG. 4. The lower run support chain 100 is provided with a plurality of socket blocks 104 (see FIG. 6) so spaced as to receive the conduits 96 of each heater element 38 as the latter pass through the lower horizontal run of their paths. The lower run support chain 100 is driven through an endless path around sprockets 106 at the same linear speed as the chain 36. A guide plate 108 substantially fills the space between sprockets 106 thus to support or back up substantially the full lengths of both the upper and lower runs of chain 100. Therefore, the socket blocks 104 can be relied on to firmly and accurately support the open ends of the heater elements 38 during the time that the heater elements hold the bags under pressure against the backing bars 42.

In FIG. 4 the backing bars 42 and the heater elements are shown in elevation. The backing bars 42 extend substantially the full lateral distance between inner chains 40 and are secured to the chains by blocks 110. As shown in FIG. 7 each backing bar 42 is a steel tube of circular cross section. While the bars 42 need not be circular in cross section it is preferred that at least the lower surfaces thereof as viewed in FIG. 7 to convex for a reason to be explained below.

In FIG. 4 the heater elements 38 are secured to the outer chains by blocks 112 and include rigid end plates 114 secured to the blocks 112 and to the lateral end portions of the conduit 96. The elements 38 also include heater bars 116 mounted in heater support bars 118 which, in turn are rigidly secured to the end plates 114. The heater bars 116 thus extend transversely parallel with the full lengths of the backing bars 42 with which they are to cooperate in sealing of the bags. The heater bars 116 preferably are circular in cross section and are so secured to the support bars 118 that each individual bar 116 may be bowed transversely of its length to assure accurate parallelism with the backing bars 42 under the considerable amount of pressure which is exerted on bags during the sealing operation. Thus, as more clearly shown in FIG. 7 a plurality of bow adjusting screws 120 are threaded into the support bars 118 in such positions as to wedge with varying degrees of pressure against the heater bars 116 at several points along the lengths thereof. Each bow adjusting screw 120 is provided with a lock nut 122 to hold the screw in desired position of adjustment.

The heater bars 116 may be of any suitable commercially available type. As shown in FIG. 7 they are made up of tubes encasing resistance wires 117.

Each heating element 38 preferably is provided with a device for visually indicating that it is operating. If one of the heater bars 116 were to burn out or otherwise fail to stay sufficiently hot a defectively sealed or unsealed bag would result each time that particular heater bar came into use. Such defective or unsealed bags may be difficult or impossible to detect by visual inspection, especially when the heat seal is being formed in a thermoplastic liner concealed within a multi-ply paper bag. As shown in FIG. 4 each heating element 38 may be provided with an indicator such as a heat sensitive unit 124 having a flag 126 which will occupy a position when the element is hot which is quite markedly different from that occupied when the element is cool. Preferably the unit 124 is a simple bimetallic coil. Also, at least one of the heating elements 38 may be provided with a thermometer (not shown) to assist in adjustment of the power supply control 71 (see FIG. 2) to the heater bars 116 to establish any particular desired temperature for operation with specific types of bags. Obviously each of the heating elements 38 may be provided with a thermometer instead of the simple flag indicators 124, 126 shown herein but the latter are believed to be preferable since inconsistent positioning of any flag 126 will be readily detectable on brief inspection even with the machine running at full production speed.

As pointed out above the main drive shaft 24, as shown in FIG. 1, is driven in a counterclockwise direction by chain 34. Referring briefly to FIG. 5 the upper end of drive shaft 24 has keyed to it two sprockets 128 and 130 which drive chains 132 and 134 respectively. Referring now to FIG. 3 the sprocket 128, which is hidden, and sprocket 130 both turn clockwise. Chain 132 drives a relatively small sprocket 136 keyed to shaft 86 and a relatively larger sprocket 138 keyed to shaft 84. An idler sprocket 140 engages the chain 132 in such position as to cause the chain to wrap several teeth on sprocket 128 to insure proper driving engagement. The ratio of pitch diameters of the smaller and larger sprockets 136 and 138 is such that the single sprocket 128 will drive the inner (backing-bar-carrying) chains 40 and the outer (heater-element-carrying) chains 36 at the same linear speed as discussed above. Thus, the smaller sprocket 136 is provided to drive the inner chains 40 and the larger sprocket 138 is provided to drive the outer chains 36.

As shown in FIG. 5, the larger sprocket 138 and the outer chain sprockets 37 are all keyed to the sprocket shaft 84 on the left-hand side of the figure, while the inner chain sprockets 44 turn freely on bearings 142 centered on said shaft 84. Similarly in said FIG. 5, the smaller sprocket 136 and the inner chain sprockets 44 are all keyed to the sprocket shaft 86, on the right hand side of the figure, while the outer chain sprockets 37 turn freely on bearings 144 centered on said shaft.

While it has just been stated that the sprocket 136 is keyed to the shaft 86 it is preferred that the sprocket 136 be so constructed as to provide for limited angular adjustment relative to the shaft 86. Thus, as shown in FIGS. 3 and 5 the sprocket 136 is mounted on a hub 146 keyed to shaft 86 and is provided with a split collar 148 having a clamping screw 150. The clamping screw 150 is threaded into one ear of the split collar 148 so as to grip the collar onto hub 146 where the screw is tightened. The screw 150 thus may hold the sprocket 136 in desired angular relationship with the hub 146 and the shaft 86.

The purpose of the angular adjustment of sprocket 136 will be best understood by referring to FIG. 7. In order for the machine of the present invention to be operative with bags of different thickness in different production runs the spacing between the heater bars 116 and the backing bars 42 should be accurately adjustable so that during the heat sealing operation a run of bags of a particular thickness will receive just enough pressure to accomplish the purpose without danger of too much pressure which could result in faulty seals. In order to avoid individual adjustment of all of the heater bars 116 or backing bars 42, or both, the present invention provides for lengthwise adjustment of the relative positions of the chains 36 and 40. Since the gripping surfaces of the backing bars 42 and of the heater bars 116 are convex a small change in the relative positions of the bars in their lengthwise paths will cause a change in the spacing between the mating bars which is uniform for all of the bars. In FIG. 7 for example an advancement of the chain 40 relative to the chain 36 by adjustment of the sprocket 136 as just described, will bring the center line 152 of backing bar 42 closer to vertical registry with the center line 154 of the heater bar 116 and thus reduce the spacing between the bars. This single adjustment step will bring about uniform adjustment of the final spacing between all of the bars as they mate successively in the operation of the machine. An adjustment which causes retraction of the chain 40 relative to chain 36 will result in increased final or operative spacing between the bars 42 and 116. It will be apparent that the same results would be achieved by providing an adjustable sprocket for driving the chains 36 instead of the chains 40 as illustrated herein.

Referring again to FIG. 3 the sprocket 130 keyed to the main drive shaft 24 and which drives chain 134 serves several functions. The lower run of chain 134 engages a sprocket 156 keyed to a cross shaft 158 and is caused to wrap several teeth of the sprocket 156 by an idler sprocket 160. The shaft 158 is driven in a counter-clockwise direction and serves to drive the lower run support chain 100. In FIG. 1 the shaft 158 rotates clockwise, driving a chain 162 and sprocket 164, the latter being keyed to a drive shaft 166 for the sprocket 106 which meshes with chain 100.

Referring again to FIG. 3, the chain 134 is shown broken away. The missing portion of chain 134 is utilized to drive a timing device (not shown) for controlling bag infeed as will be described below. The upper run of chain 134 as shown in FIG. 3 drives a sprocket 168 keyed to a stub shaft 170 which also carries the first gear 172 in an eccentric gear drive train generally indicated at 174 for the bag feed rolls 54 and 56. This is the gear train which causes the bag feed rolls to advance bags at a relatively rapid overall rate with a period of slow motion timed with entry of each bag into the grip of the heater bars 116 and backing bars 42 as generally described above.

The gear train 174 is only diagrammatically illustrated herein inasmuch as different sets of gears may be required for differing operating conditions. Thus, in FIG. 3, the first gear 172 is shown as eccentric, or elliptical, and meshing with another eccentric, or elliptical, gear 176 on a stub shaft 178 which also carries a gear 179. Referring now to FIG. 2, the gear 179 meshes with another gear 180 keyed to a drive shaft 182 for the lower bag feed roll 54, the latter not being visible in said FIG. 2. As shown in FIG. 3 the gear 180 also meshes with a gear 184 fixed on the drive shaft 186 for the upper bag feed roll 56. Thus both the upper and lower bag feed rolls 54 and 56 are driven at cyclically varying speeds, with a period of slow speed so timed to permit each successive bag end to be properly and firmly gripped between successive pairs of heater bars 116 and backing bars 42 and a period of faster speed after each bag is gripped.

In FIG. 6 a belt 188 is shown trained around the lower bag feed roll 54. This belt may be a wide belt or it may be made up of a plurality of parallel narrow, spaced belts depending upon the type of infeed apparatus associated with the machine of the present invention. Furthermore the infeed apparatus may not include any belt 188 and in that event a stationary table top would extend into close proximity with the surface of roll 54. The particular infeed apparatus therefore may be any of the various types used for feeding sheet material to printing machines and the like. In any event the upper feed roll is yieldably urged downwardly towards the lower feed roll 54, thus to yieldably grip the several bag blanks which may be between the rolls at any given time. Details of the mounting of such floating upper roll 56 are not shown herein.

In FIG. 6 bag blanks A, C, D and E as shown in full lines and a bag AA is shown in broken lines. The bag AA represents the bag A in an intermediate advanced position having just been released by the heating element 38A and backing bar 42A also shown in broken lines. The bags A, C and D are gripped and are in process of being heat sealed. Bag E has entered between and is just about to be gripped between a heating element 38 and backing bar 42. In FIG. 8 the bags have advanced to a point in which bag A has been released and is falling toward a stack S of finished bags. Bag E has advanced and is now firmly gripped by a heating element 38E and a backing bar 42E. A new succeeding bag blank F is shown entering between a backing bar 42F and a heating element 38F.

In FIG. 8 there is also shown a plunger P driven by a cylinder Q under the control of a valve (not shown) which is actuated in proper time relation by the chain 134 (see FIG. 3) as discussed above. The plunger P is moved from the broken-line position shown in FIG. 8 to the full-line position at the proper time to push a bag blank into the feed rolls 54 and 56 in properly squared relationship. The plunger P is then retracted for operation on the next succeeding bag blank. As is apparent in FIG. 8 the plunger P has pushed the bag blank F into the rolls 54 and 56 and the latter have further advanced bag blank F into the space between the heater element 38F and backing bar 42F. It is during this operation that the driving mechanism (gear train 174 in FIG. 2) slows the feed rolls 54 and 56 to hold bag blank F in position to be gripped by the heater element and backing bar and then accelerates the feed rolls so that the bag blank F will be over fed after it is gripped. The over feeding provides the slack shown in bag blanks E and D. The slack is essential inasmuch as the blanks E and D are still in the nip of feed rolls 54 and 56 when the latter slow down temporarily incident to insertion of bag blank F as just described.

As shown in FIG. 8 the backing bar 42F is rapidly catching up with heater element 38F and as they pass through the position of bar 42E and element 38E as shown in FIG. 6 gripping of bag blank F is about to occur. When bar 42F and element 38F enter the lower straight runs of their respective chains 40 and 36 the bag blank F will be fully gripped as is the bag blank D shown in FIG. 6.

Returning to FIG. 8 it will be apparent that the backing bar 42A has started to pull ahead of the heater element 38A and as it enters the upper straight run of chain 40 it will have pulled away by one-half the longitudinal spacing between successive bars 42 or heater elements 38. This spacing will remain fixed through the upper runs of chains 36 and 40. At the left hand end of said upper run a backing bar 42G is shown which previously had been mated with the heater element 38H. As the backing bar 42G moves around the left-hand sprocket 44 it will advance even further away from element 38H and toward heating element 38G and eventually will grip a bag blank G (not shown in FIG. 8) in the same manner as the blank F has been gripped.

The stack S of finished bags may be accumulated on a table 190 (see FIG. 4) and removed periodically by hand. Obviously some form of takeaway conveyor may be substituted for the table 190 to withdraw the bags continuously or periodically as may be desired.

A primary function of the plunger P (see FIGS. 8 and 9) is to assist in squaring the bags which may not land upon the belt 188 in exactly squared position. If a stationary work table is used instead of the belt 188 the plunger P can be relied upon alone to square the bags and to insert the leading ends of successive bags into the nip of the feed rolls 54 and 56. In the latter event it may be preferred to locate the plunger P and cylinder Q beneath the work table with the working face of plunger P extending vertically through a suitable slot in the table top.

To adjust the machine for operation on runs of bags of different lengths it is only necessary to change the point at which plunger P reaches the point in its movement toward the right as viewed in FIG. 8, at which the leading edge of the bag enters the nip of feed rolls 54 and 56. This may be done by moving the assembly of plunger P and cylinder Q or by varying the position of the working face of plunger P upon the piston rod of the cylinder Q. Alternatively the timing of the stroke of plunger P may be adjusted so that the working face of the plunger reaches a position in which the leading edges of a run of bags of particular length enters the nip of feed rolls 54 and 56 at the correct moment in each cycle. Neither the speed of the chains 36 and 40 nor the longitudinal spacing of the heating elements 38 and backing bars 42 on their respective chains need to be changed for operation on runs of bags of different lengths.

In FIGS. 9 and 10 there is illustrated a production line including the machine of the present invention and a typical bag which may be produced by such a line. In FIG. 9 an open-ended tubular bag blank I which has been formed on suitable apparatus, for example on a tuber (not shown) and has been cut to desired length is shown on a feed table 192. By well known means such as belts and/or feed rolls (not shown) the blank I is moved continuously and upwardly as viewed in FIG. 9 in definite laterally spaced relation with a preceding identical blank H which is moving across a work table 194. The work table 194 is provided with suitable bottom forming devices. For example a sewing head 196 is arranged to form a continuous chain of stitches 198 across one end of successively presented bag blanks and a tape 200 may be folded over the stitches and the adjacent bag end and adhesively secured so as to cover and seal the end and the line of stitches. As shown in FIG. 9 the tape 200 is folded around the end of the bag in a guide 202 and is pressed in position by rolls 204. The continuous chain of stitches 198 and tape 200 extending between successive bags may be cut by a cutter 206 to separate the bottomed bag blanks. The bag blank G is moving through the tape applying and cutting stations and will be progressively moved over and dropped upon the preceding bag blank F by means including delivery rolls 208.

The speed of lateral feeding of the bag blanks across the work table 194 as well as the speeds and timing of the sewing head 196 as well as the tape applying and cutting devices 202, 204, 206 must be so synchronized with the speed and timing of the plunger P and the heat sealing machine of the present invention as to assure delivery of successively sewn and taped bag blanks at the proper time intervals. For bag blanks of substantially different widths the speed and timing of these devices should be appropriately resynchronized. However, for bag blanks of widths which differ by relatively small amounts the lateral spacing between bag blanks on the work table 194 may be increased or decreased somewhat resulting only in a corresponding change in the length of waste tape and stitching extending between successive bag blanks.

In FIG. 10 there is shown in fragmentary form a particular bag typical of a general class of bags which may be processed on the machine of the present invention. The bag comprises an inner liner 210 made of tubular thermoplastic material enclosed within at least one outer tubular ply 212 of strong sheet material such as kraft paper. As shown in FIG. 10 the bag includes three additional inner tubular plies 214, which may consist of strong sheet material such as kraft paper of the same or different types and which may or may not be of the same type as used for the outer ply 212. The thermoplastic liner 210 and surrounding ply or plies of paper have been formed and assembled on conventional tubing, spotting, pasting and cutting apparatus (not shown) into open end bag blanks such as the blank I shown in FIG. 9. As shown in FIG. 10 the bag blank has passed through the sewing head 196 and tape applying and cutting devices 202, 204 and 206. The line of stitching 198 is shown as extending through all of the plies of paper and through the inner liner 210 while the tape 200 is shown as covering both sides of the line of stitches 198 and extending over the edges of the various plies of paper 212 and 214. It is this stitched and taped end of the bag blank which becomes the leading edge of the blank as it is fed into the heat-sealing machine of the present invention. In this particular instance the stitched and taped leading edge of the bag blank has been inserted into the heat-sealing machine in such timed relation that the heating element 38 and mating backing bar 42 have gripped the bag blank close to but slightly to the rear of the line of stitching 198 whereby the line of heat sealing or welding 216 has been formed inside the bag where it will be effective to prevent sifting or leaking of the contents through the line of stitching 198.

From a consideration of the particular bag illustrated in FIG. 10 it will be apparent that to form the line of heat seal 216 heat must be conducted from the heater bar 116 through several layers of paper constituting the plies of the bag and the sealing tape 200. Since paper is a relatively poor conductor of heat it will be appreciated that each bag must be held under heat and pressure for a rather extended period of time to assure the formation of an effective heat seal. The machine of the present invention is very well adapted to form heat seals in bags of the illustrated type because it affords the requisite extended period of heat and pressure at high production rates without taking up a great amount of floor space. This is accomplished by feeding the bags in lengthwise direction, partially overlapping several successive bags and gripping them throughout their widths in the heat-sealing devices 38, 42 which are spaced quite closely together lengthwise of the chains 36 and 40 and thus for any given production rate move at linear speeds much less than would be required if the bags were not so overlapped.

For operation with runs of bags having different number or thickness of plies or having inner liners of different types or thicknesses of thermoplastic materials the temperature of the heater bars may be set at appropriate levels related to the rate of production. As noted above such adjustment may be effected by use of the variable transformer 71 (see FIG. 2). Appropriate adjustment also may be made for the different thicknesses of such runs of bags by means of the adjustable sprocket 136 (see FIG. 2). Such adjustments, coupled with appropriate adjustment of the speed of rotation of the main drive shaft 24 of the machine, make it possible to use the machine of the present invention for production of a very wide variety of types and sizes of bags at production speeds matching those of the remaining equipment in production lines. It should be noted that to grip the bags and hold them under heat and pressure the heating elements 38 and backing bars 42 are positively brought into a fixed final position with respect to each other.

For the present embodiment of this invention it is believed to be preferable that a fixed spacing be left between these elements in their final gripping position rather than to rely upon yieldable pressure as is sometimes the case in the prior art. At least with certain types of thermoplastic materials, continuous progressive squeezing of the heated and softened material can produce weak seams.

From a consideration of the foregoing detailed description of a preferred form of the present invention it will be apparaent that a great many commercially available standard parts are used, the particular details of which are not essential features of the present invention. Thus, the sprocket chains 36 and 40 and the heating elements 38 and backing bars 42 respectively carried thereby make up separate conveyors with the path of the outer conveyor 36, 38 circumscribing the path of the inner conveyor 40, 42. The paths of such separate conveyors include the straightaway portion in which the heating elements 38 and backing bars 42 are in bag gripping relationship and return portions in which each backing bar 42 on inner chains 40 progressively moves ahead of the heating element 38 with which it is was engaged in the straightaway and progressively catches up with another heating element 38 for the next passage through the straightaway. The paths of the chains 36 and 40 which form a part of the conveyors 36, 38 and 40, 42 are defined by sprocket wheels and guiding and supporting plates and the lower run support chain 100. Obviously, instead of the standard sprocket chains illustrated herein, other forms of flexible conveyor elements may be used, for example, the toothed, flexible, inextensible power belts currently finding much favor in uses where sprocket chains traditionally have been used. Similarly, the paths of the conveyors 36, 38 and 40, 42 need not be defined by the particular means shown herein, particularly in view of the fact that the return portions of both paths need not have the curved portions thereof defined by the sprockets and need not have an upper straightaway portion since a continuously curved return path would serve the same purpose. Such return paths may be defined by guide rollers or guide plates as may be regarded as most suitable or practical by others skilled in this art.

What is claimed is:

1. In a bag sealing machine a first endless conveyor, a series of first bag engaging elements forming a part of said first conveyor and extending transversely at equally spaced intervals longitudinally thereof, means for driving said first conveyor longitudinally at a predetermined linear speed through a closed path including at least one straightaway portion, a second endless conveyor, a series of second bag engaging elements forming a part of said second conveyor and extending transversely thereof at equally spaced intervals identical with the equally spaced intervals between said first bag engaging elements on said first conveyor, means for driving said second conveyor longitudinally at the same linear speed as said first conveyor through a closed path which completely surrounds the path of said first conveyor and which includes at least one straightaway portion in which said second bag engaging elements travel paired in bag gripping relation with first bag engaging elements in the straightaway portion of the path of said first conveyor, said paths of said first and second conveyors each including a return portion, and means for guiding said conveyors through concentric nested curcves in the return portions of their paths in which each of said first bag engaging elements progressively moves ahead of and out of bag gripping relationship with the second bag engaging element with which it was paired in said straightaway portions of said paths and progressively catches up with and reaches bag gripping relationship with another second bag engaging element to travel therewith through said straightaway portions of said paths.

2. A bag sealing machine as set forth in claim 1 in which the bag engaging surfaces of at least one of said series of bag engaging elements is convexly curved.

3. A bag sealing machine as set forth in claim 2 in which one of said conveyors is provided with means for adjusting it longitudinally with respect to the other of said conveyors to establish a fixed uniform spacing between all of the pairs of bag engaging elements in said straightaway portions of said paths of said conveyors.

4. A bag sealing machine as set forth in claim 1 in which each of said first bag engaging elements is a backing bar and each of said second bag engaging elements is a heating bar.

5. A bag sealing machine as set forth in claim 2 in which each of said first bag engaging elements is a backing bar and each of said second bag engaging elements is a heating bar.

6. A bag sealing machine as set forth in claim 3 in which each of said first bag engaging elements is a backing bar and each of said second bag engaging elements is a heating bar.

7. In a bag sealing machine a first endless conveyor, a series of first bag engaging elements forming a part of said first conveyor and extending transversely at equally spaced intervals longitudinally thereof, means for driving said first conveyor longitudinally at a predetermined linear speed through a closed path including at least one straightaway portion, a second endless conveyor, a series of second bag engaging elements forming a part of said second conveyor and extending transversely thereof at equally spaced intervals identical with the equally spaced intervals between said first bag engaging elements on said first conveyor, means for driving said second conveyor longitudinally at the same linear speed as said first conveyor through a closed path which circumscribes the path of said first conveyor and which includes at least one straightaway portion in which said second bag engaging elements travel paired in bag gripping relation with first bag engaging elements in the straightaway portion of the path of said first conveyor, said paths of said first and second conveyors each including a return portion, and means for guiding said conveyors through curves in the return portions of their paths in which each of said first bag engaging elements progressively moves ahead of and out of bag gripping relationship with the second bag engaging element with which it was paired in said straightaway portions of said paths and progressively catches up with and reaches bag gripping relationship with another second bag engaging element to travel therewith through said straightaway portions of said paths, said conveyors each comprising a pair of spaced endless sprocket chains to which said bag engaging elements are secured, and said means for guiding said conveyors in curves in the return portions of their paths including toothed sprocket wheels engaging said chains, the pitch diameters of the sprocket wheels engaging the chains of said first conveyor being smaller than the pitch diameters of the sprocket wheels engaging the chains of said second conveyor thus to establish said path of said second conveyor which circumscribes said path of said first conveyor.

8. A bag sealing machine in accordance with claim 7 in which there is provided two sprocket shafts, said shafts extending transversely of the paths of said conveyors and being spaced longitudinally of said paths to establish the straightaway and return portions of both of said paths, the sprocket wheels for one of said conveyors being fixed to one of said shafts and freely rotatable with respect to the other shaft, and the sprocket wheels for the other of said conveyors being fixed to the other shaft and freely rotatable relative to said one shaft, and means for driving one of said shafts at a predetermined angular speed and for driving the other of said shafts at angular speed so related to said predetermined angular speed that the linear speeds at which both of said conveyors are driven through their endless paths are equal.

9. A bag sealing machine in accordance with claim 8 in which the bag engaging elements on said first conveyor are backing bars and the bag engaging elements on said second conveyor comprise electrical heating bars, and in which said sprocket shafts are carried in bearings cantilevered from rigid supports on one lateral side only of the paths of said conveyors, said sprocket shafts terminating in free ends on the opposite lateral side of said paths, and electric power conducting means comprising a group of wires extending from each of said heating bars laterally of the paths of said conveyors and beyond the free ends of said sprocket shafts, a hub rotatable about an axis extending transversely of and inside the endless path of said first conveyor, collector rings on said hub and brushes connecting said collector rings with a source of electric power, a plurality of conduits equal in number to the number of heating bars on said second conveyor, said conduits being fixed to and extending radially from said hub, a group of wires connected with said collector rings extending through each of said conduits, a flexible cable connecting the group of wires within each of said conduits with a group of wires extending from each of said heater bars, and means for rotating said hub through one complete revolution for each complete circuit of said second conveyor through its endless path.

10. In a bag sealing machine a first endless conveyor, a series of first bag engaging elements forming a part of said first conveyor and extending transversely at equally spaced intervals longitudinally thereof, means for driving said first conveyor longitudinally at a predetermined linear speed through a closed path including a first curved portion leading into a straightaway portion, and a second curved portion leading out of said straightaway portion, a second endless conveyor, a series of second bag engaging elements forming a part of said second conveyor and extending transversely thereof at equally spaced intervals identical with the equally spaced intervals between said first bag engaging elements on said first conveyor, means for driving said second conveyor longitudinally at the same linear speed as said first conveyor through a closed path which completely surrounds the path of said first conveyor and which includes a first curved portion leading into a straightaway portion in which said second bag engaging elements travel paired in bag gripping relation with first bag engaging elements in the straightaway portion of the path of said first conveyor and also including a second curved portion leading out of said straightaway portion, said curved portions of the path of said first conveyor being inside of and sharper than the curved portions of the path of said second conveyor whereby when said conveyors enter the curved portions leading out of said first bag engaging elements progressively moves ahead of and out of bag gripping relationship with the second bag engaging element with which it was paired in said straightaway portions of said paths, and when said conveyors enter the curved portions leading into said straightaway portions each of said first bag engaging elements progressively catches up with and reaches bag gripping relationship with another second bag engaging element to travel therewith through said straightaway portions of said paths.

11. A bag sealing machine in accordance with claim 10 in which there is provided means for feeding the unsealed ends of a series of bag blanks successively in timed relation into the spaces between pairs of bag engaging means as each pair thereof move through the first curved portions of the paths of said conveyors, whereby each bag blank is gripped when the first bag engaging means of each pair catches up with the second bag engaging means of that pair.

12. A bag sealing machine in accordance with claim 11 in which said bag blank feeding means comprises means for moving bag blanks lengthwise at an average linear speed substantially in excess of the linear speed of said conveyors and periodically at a slower linear speed approximately equal to the linear speed of said conveyors, said periods of slower feed of said bag blanks being so timed with respect to the positions of said conveyors in their endless paths as at least to occur during the time at which each pair of said bag engaging elements is in the act of gripping the unsealed end of a bag blank.

13. A bag sealing machine in accordance with claim 12 in which said bag blank feeding means includes means for dropping a series of bag blanks successively upon a preceding bag blank, and means for engaging each bag blank with said means for moving the blanks lengthwise for movement of each bag blank by said last-named means a predetermined lengthwise distance before the next succeeding bag blank is dropped theeron and engaged with said means for moving said bag blanks lengthwise, whereby said means for moving said bag blanks lengthwise is effective to move said series of bags in overlapped relation with the unsealed ends thereof spaced to correspond with the lengthwise spacing of said bag engaging means on said conveyors.

References Cited

UNITED STATES PATENTS 3,004,881 10/1961 Van Der Meullex __ 156—290X
3,192,095 6/1965 Doven et al. _____ 156—583X BENJAMIN A. BORCHELT, Primary Examiner JERALD J. DEVITT, Assistant Examiner U.S. Cl. X.R.

156—290

UNITED STATES PATENT OFFICE
CERTIFICATE OF CORRECTION

Patent No. 3549462          Dated Dec. 22, 1970

Inventor(s) Clinton R. Hollis

It is certified that error appears in the above-identified patent and that said Letters Patent are hereby corrected as shown below:

Col. 3, line 70, "fromed" should be --formed--

Col. 5, line 63, "to" should be --be--

Col. 11, line 67, (Claim 1) "curcves" should be --curves--

Col. 13, line 52, (Claim 10) before "first" insert --straight-away each of said--

Col. 14, line 36, (Claim 13) "theeron" should be --thereon--

Col. 14, line 45 "Van Der Meullex" should be --Van Der Meullen--

Signed and sealed this 30th day of March 1971.

(SEAL)
Attest:

EDWARD M. FLETCHER, JR.
Attesting Officer

WILLIAM E. SCHUYLER, JR.
Commissioner of Patents